(12) United States Patent
Morosas (10) Patent No.: US 6,367,703 B1
(45) Date of Patent: Apr. 9, 2002

(54) HEAT RECOVERY SYSTEM (76) Inventor: Christopher G. Morosas, 122 Dudley Rd., Sutton, MA (US) 01590

( * ) Notice: Subject to any disclaimer, the term of this patent is extended or adjusted under 35 U.S.C. 154(b) by 0 days.

(21) Appl. No.: 09/544,771

(22) Filed: Apr. 7, 2000

(51) Int. Cl.[7] .................................................. F24B 7/00
(52) U.S. Cl. .......................................... 237/55; 237/19
(58) Field of Search .................... 237/55, 19; 122/20 B; 165/47, DIG. 2

(56) References Cited

U.S. PATENT DOCUMENTS

| 2,189,749 A | | 2/1940 | Windheim et al. | |
|---|---|---|---|---|
| 2,874,943 A | | 2/1959 | Fennell | |
| 2,893,705 A | | 7/1959 | Fennell | |
| 3,934,798 A | * | 1/1976 | Goldsmith | 237/55 |
| 4,037,786 A | | 7/1977 | Munroe | |
| 4,158,439 A | | 6/1979 | Gibbs | |
| 4,251,028 A | | 2/1981 | Nicolai et al. | |
| 4,313,562 A | * | 2/1982 | White | 237/55 |
| 4,342,359 A | * | 8/1982 | Baker | 165/47 |
| 4,351,276 A | | 9/1982 | Kremer | |
| 4,363,353 A | * | 12/1982 | Pranaitis | 165/39 |
| 4,379,447 A | | 4/1983 | Schott et al. | |
| 4,550,772 A | * | 11/1985 | Knoch | 165/47 |
| 4,580,621 A | | 4/1986 | Lovrich et al. | |
| 4,854,381 A | * | 8/1989 | Mikula | 165/158 |

* cited by examiner

Primary Examiner—Harold Joyce
Assistant Examiner—Derek S. Boles
(74) Attorney, Agent, or Firm—Blodgett & Blodgett, P.C.

(57) ABSTRACT

A heating system for a building that includes a furnace having a water jacket surrounding a burner unit. Heated water is circulated from the water jacket to a heat exchange system in the building such as radiators and the water is returned to the water jacket through a return conduit to be reheated. Water from the jacket is also circulated through supplemental conduit through a gas tube water heat exchange apparatus located at the exhaust flue from the furnace for recovering heat from the exhaust gases. Water heated from the exhaust gases returns to the primary circulation system. More specifically, water flows from the cooler portions of the water jacket and/or the return conduit of the main circulation system to the gas-to-water heat exchange unit. Water flows from the gas-to-water heat exchange unit to the relatively warmer portions of the jacket and/or to the primary conduit that delivers water from the jacket to the heat exchange system of the building.

15 Claims, 6 Drawing Sheets

HEAT RECOVERY SYSTEM

CROSS-REFERENCE TO RELATED APPLICATIONS

Not Applicable

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed generally to an improved heating system for a building. The invention is directed more specifically to a heating system which recovers or recuperates heat of combustion from the exhaust gases from a conventional boiler or furnace that would normally be lost to the environment.

A typical furnace is usually constructed of cast iron or steel containing an interior space. A burner unit projects a flame into this space, thereby, producing both radiant and convective heat energy. This space is surrounded on five sides by a hollow jacket of either cast iron or steel. The fluid, typically water, that resides within this jacket absorbs both the radiant heat and convective heat through conduction across the jacket wall. To enhance heat transfer, some jacket walls possess fins protruding in the combustion gas flow stream. These fins may also protrude into the fluid as well. The additional face area provided by these fins increases the quantity of heat that can be absorbed. The water in the water jacket is heated to a predetermined temperature and then pumped or otherwise circulated through a heat exchanger system within the building for space or process heating. The cooled water returns, by pumping or gravity, to the water jacket to be reheated and the cycle is repeated. Furnace heating can occur with a plurality of fuels such as wood, fuel, oil, or gas. Most of this combustion energy is imparted to the water within the jacket. Nevertheless, the combustion gas leaving the boiler possesses recoverable energy which is, otherwise, lost to the environment.

It is, therefore, a principal object of the invention to provide a heating system for a building which also recovers heat from the exhaust gases from a furnace.

A further object of the invention is the provision of auxiliary heat recovery system for a conventional heating system for recovering heat from the exhaust gases from a furnace.

Another object of the invention is the provision of a supplemental fluid circulation system for a heating system for recovering heat from furnace exhaust gases and for transferring the recovered heat to the main fluid circulation system of the heating system.

A still further object of the invention is to provide supplemental fluid circulation system for a heating system which draws relatively cool fluid from the main fluid circulation system, transfers heat from the furnace exhaust gases to the relatively cool fluid and returns the heated fluid to a portion of the main fluid circulation system which contains relatively warm fluid.

Still another object of the invention is the provision of an improved gas-to-water heat exchange apparatus for recovering heat of exhaust gases at the flue of a heating system.

BRIEF SUMMARY OF THE INVENTION

In general, the invention consists of a heating system for a building that includes a furnace having a water jacket surrounding a burner unit. Heated water is circulated from the water jacket to a heat exchange system in the building such as radiators and the water is returned to the water jacket through a return conduit to be reheated. Water from the jackets is also circulated through a supplemental conduit through a gas tube water heat exchange apparatus located at the exhaust flue from the furnace for recovering heat from the exhaust gases. Water which is heated by the exhaust gases returns to the primary circulation system. More specifically, water flows from the cooler portions of the water jacket and/or the return conduit portion of the main circulation system to the gas-to-water heat exchange unit. The water then flows from the gas-to-water heat exchange unit to the relatively warmer portions of the jacket and/or to the primary conduit that delivers water from the jacket to the heat exchange system of the building.

BRIEF DESCRIPTION OF THE DRAWINGS

The character of the invention, however, may be best understood by reference to one of its structural forms, as illustrated by the accompanied drawings, in which.

DETAILED DESCRIPTION OF THE INVENTION

Figure 1:
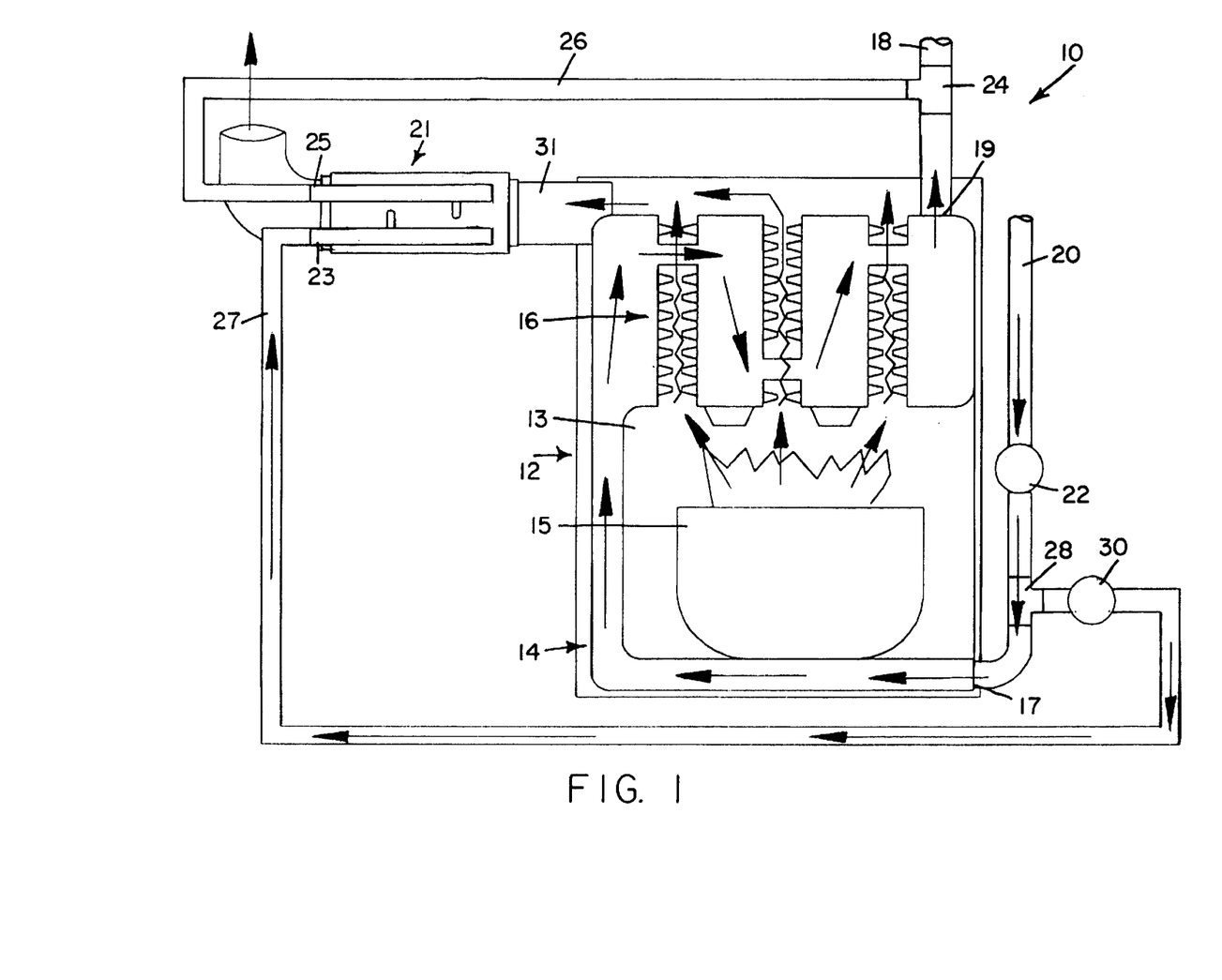
FIG. 1 is a diagrammatic view of a heating system for a building, embodying the principles of the present invention in a first phase of operation.
Figure 2:
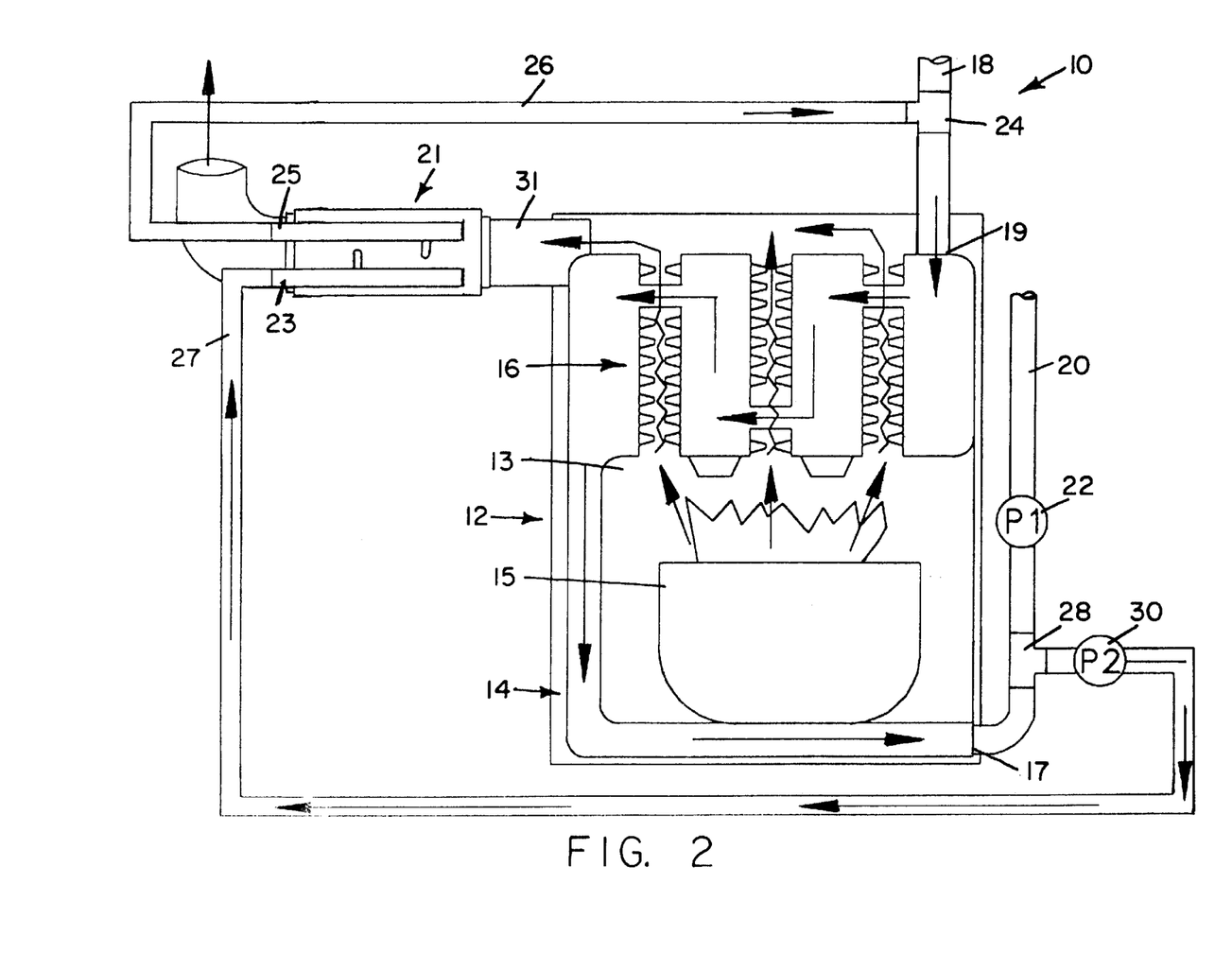
FIG. 2 is a view similar to FIG. 1 showing a heating system a second phase of operation.
Figure 3:
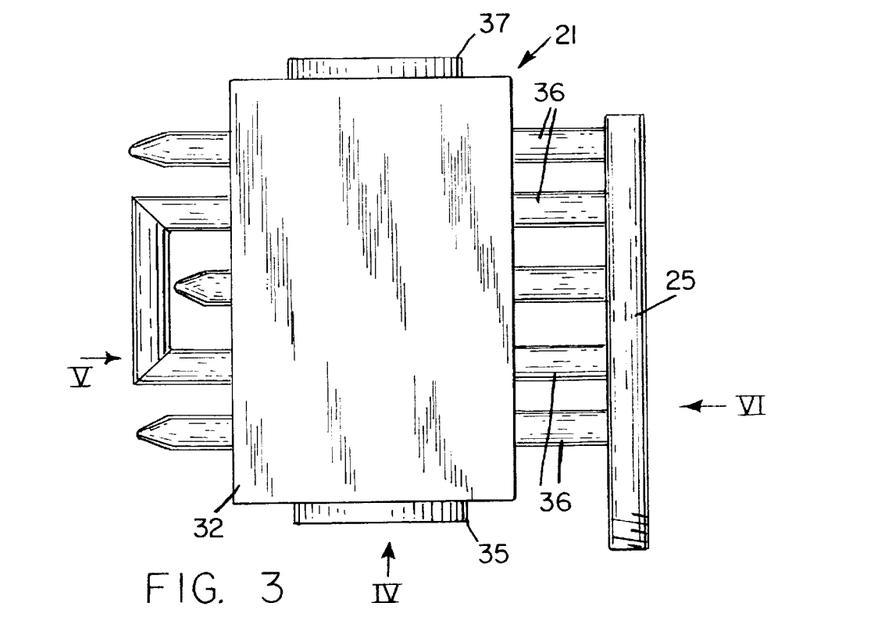
FIG. 3 is a top plan view of a gas-to-water heat recovery apparatus embodying the principals of the present invention.
Figure 4:
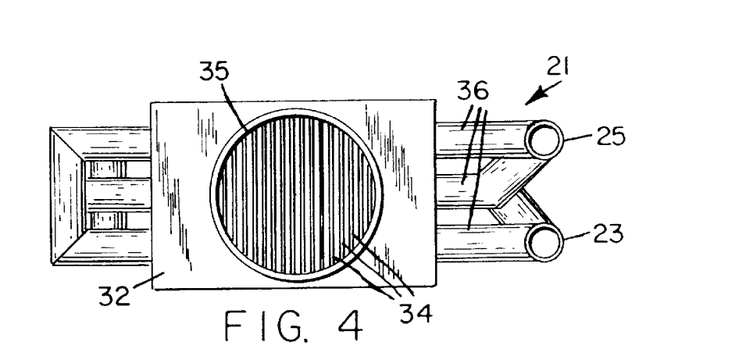
FIG. 4 is an end view, looking in the direction of arrow IV of FIG. 3.
Figure 5:
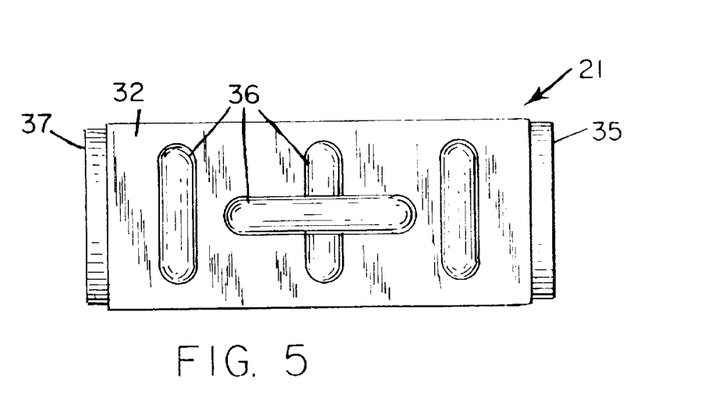
FIG. 5 is a side elevational view, looking in the direction of arrow V of FIG. 3.
Figure 6:
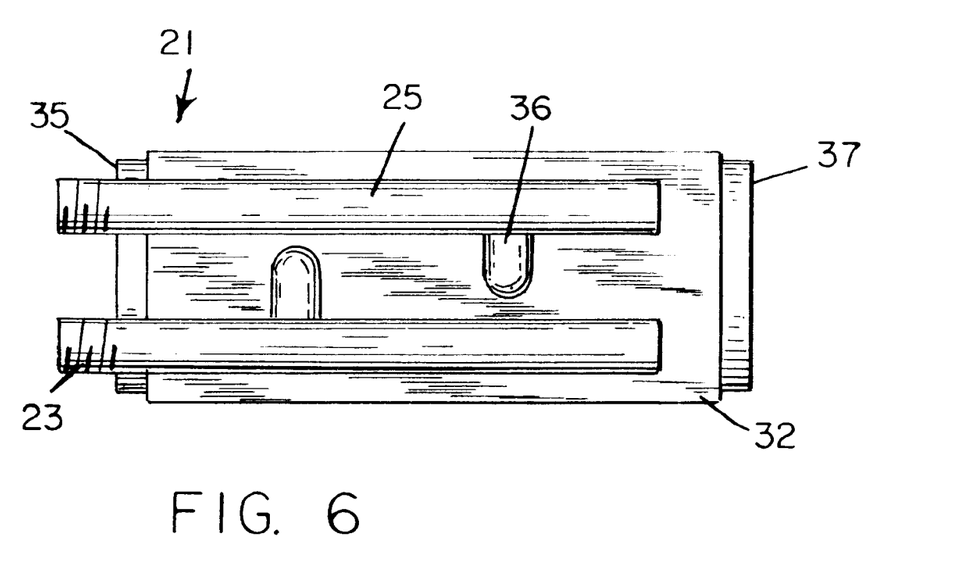
FIG. 6 is a side elevational view, looking in the direction of arrow VI of FIG. 3.

Referring first to FIGS. 1 and 2, there is shown a heating system for a building embodying the principal of the present invention and generally indicated by the reference numeral 10. The heating system 10 is operatively connected to the heat exchange system of a building such as radiators, not shown, and to a gas venting system such as a , not shown.

Heating system 10 includes a conventional furnace such as a fuel oil burning furnace, generally indicated by the reference numeral 12. Furnace 12 includes an interior space 13 generally surrounded by a water jacket 14 and a burn unit 15 for presenting a flame into the space 13. A primary gas-to-water heat exchange apparatus, generally indicated by the reference numeral 16, is located above the space 13 and is integrated with the outer portion of the water jacket 14. A water jacket 14 has a primary water inlet 17 and a primary water outlet 19.

A primary feed conduit 18 is connected to the primary water outlet 19 and is connected to the heat exchange system of the building such as radiators, not shown. A primary return conduit 20 is connected to the primary water inlet 17 and to the heat exchange system of the building. A primary pump 22 is located in the primary return conduit 20 for circulating water from the jacket 14 through the heat exchange system of the building and back to the water jacket through the primary return conduit 20.

A secondary gas-to-water heat exchange apparatus, generally indicated by the reference numeral 21, is connected in line to a flue 31 for transferring exhaust gases from the furnace 12 to the chimney of the building, not shown. The secondary gas-to-water heat exchange apparatus 21 has a secondary water inlet 23 and a secondary water outlet 25. A supplemental feed conduit 26 is connected to the secondary water outlet 25 and to the primary feed conduit 18 by means of a T-connection 24. The conduit 26 is located above the furnace 12. A supplemental return conduit 27 is connected to the secondary water inlet 23 and to the primary return conduit 20 by means of a T-connection 28. A secondary pump 30 is located in the supplemental conduit 27.

Referring to FIGS. 3–6, the secondary gas-to-water heat exchange apparatus 21 comprises a housing 32 that has a chamber 33 which contains a plurality of spaced vanes or plates 34. The housing 32 has an inlet opening 35 and an outlet opening 37 to the chamber 33. Each of the secondary water inlet 23 and the secondary outlet 25 is a manifold pipe. A plurality of U-shaped tubes 36 extend from the manifold pipes through the housing 32 and the plates 34. Each U-shaped tube 36 extends from the secondary water inlet through the housing 32 to a point beyond the housing and back through the housing to the secondary water outlet 25.

The secondary gas-to-water heat exchange apparatus 21 is installed in the flue 31 by creating a gap in the flue, i.e. by cutting out a section of the flue, and attaching a portion of the flue that extends to the furnace 12 to the inlet opening 35. Apparatus 21 allows elimination of barometric draft control in flues, thereby eliminating a source of building infiltration. The purpose of draft control is to reduce velocity of gas through boiler section(s). A portion of the flue 31 that extends to the chimney is connected to the outlet opening 37. Exhaust gases flowing through the housing 32 heats the vanes or plates 34. The heat from the vanes or plates 34 are transferred to water flowing through the tubes 36 from the secondary water inlet 23 to the secondary outlet 25.

Each of the pumps 22 and 30 is controlled by a thermostat to be on or off. When heat is called for in the building requiring hot water to be circulated through the heat recovery system of the building, pumps 22 and 30 are turned on. Heated water from the jacket 14 is pumped, primarily by the pump 22, to the heat exchange system of the building through the primary water outlet 18 from the upper portion of the jacket and return to the lower portion of the jacket by means of the primary return conduit 20. The pump 32 pumps water from the primary return conduit 20 through the heat exchanger 21 and to the primary feed conduit 18 to supplement the heated water being pumped from the jacket 14. The flow path of gases and water is shown in FIG. 1 for this phase of operation.

Figure 7:
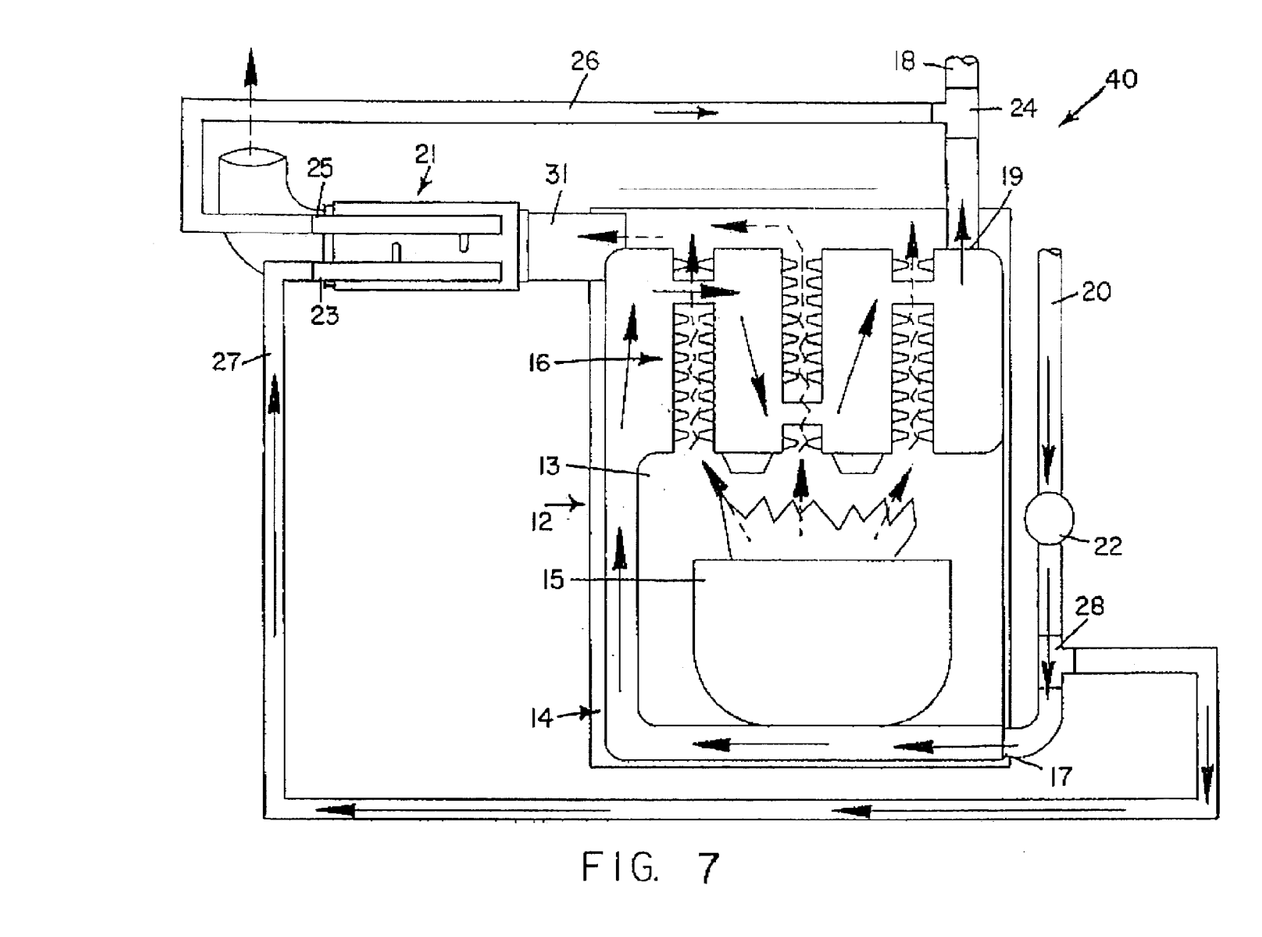
FIG. 7 is a diagrammatic view of a first modified heating system.

When there is no demand for heated water by the heat exchange system of the building, pump 22 is off and pump 30 remains on. In this phase, water is pumped from the lower portion of the jacket 14 through the heat exchange apparatus 21 and back to the upper portion of the jacket 14 by the primary feed conduit 18. During this phase, water in the jacket 14 is heated, even though there is no demand for heated water by the heat exchange system of the building to maintain the water in the jacket 14 at a set temperature. During this phase of operation, the burner 15 operates to heat the water in the jacket 14 and maintains the water at a set temperature which also produces exhaust gases through the flue 31. The heat from the exhaust gases flowing through the flue 31 is recovered by the heat exchange apparatus 21 for heating relatively cooler water at the lower portion of the jacket 14 and reintroducing the heated water into the upper portion of the jacket 14 to supplement the initial heating process and for maintaining the water in the jacket 14 at a set temperature. This supplemental heating of the water in the jacket results in the burner firing less frequently and for shorter durations, therefore, substantially increasing the efficiency of the process of maintaining the water in the jacket at a set temperature. A supplemental feed conduit 26 is located above the water jacket 14. Water will circulate by gravity from the lower portion of the water jacket to the upper portion of the water jacket in the absence of the secondary pump 30, due to the fact that relatively cold water is denser and heavier than relatively warm water. A first modified heating system which utilizes a single pump is shown in FIG. 7 and generally indicated by the reference numeral 40. However, the positive circulation of water into and out of the water jacket by means of the pump 30 is substantially more efficient than a passive system without the pump 30.

Figure 8:
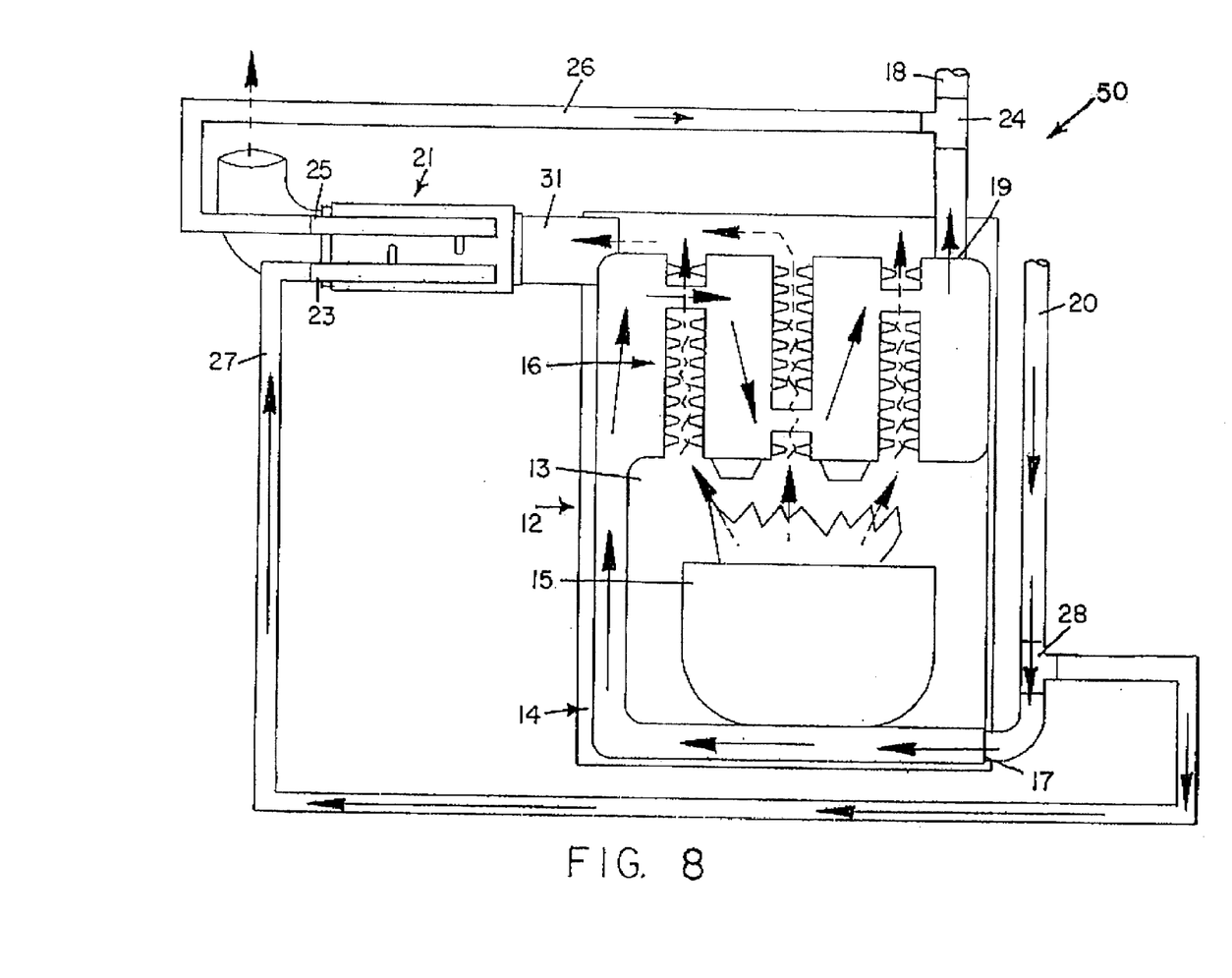
FIG. 8 is a diagrammatic view of a second modified heating system.

The invention can also be effective when used in a passive or gravity fed heating system which has no primary pumping element such as the second modified heating system shown in FIG. 8 and generally indicated by the reference numeral 50. The advantages of supplemental water flow through the heat exchange apparatus 20 in such a system substantially increases the efficiency of such a system with or without the use of the secondary pump 30.

The heat exchange apparatus 20 and conduits 26 and 27 can form part of an originally installed heat system or can be retrofitted to an existing heating system by connecting the conduits 26 and 27 to the primary conduits 18 and 20, respectively, as shown in FIGS. 1 and 2, with the use of T-connectors 24 and 28 and installing the heat exchange apparatus 21 and flue 31 by cutting out a portion of the flue 31 and connecting the exposed free ends of the flue to opposite ends of the heat exchanger 21.

What is claimed is:

1. A heating system for a building which includes a gas venting system and a heat exchange system for said building, said heating system comprising:

(a) a furnace having an interior space and means to present a flame into said interior space;

(b) a water jacket surrounding said interior space and having a primary water inlet at the lower end of the water jacket, and a primary water outlet at the upper end of the water jacket;

(c) A gas exhaust flue operatively connected to said interior space and for being connected to said gas venting system;

(d) a primary feed conduit connecting said heat exchange system to said primary water outlet;

(e) a primary return conduit connecting said heat exchange system to said primary water inlet;

(f) a gas-to-water heat exchange apparatus operatively connected to said gas exhaust flue and having a secondary water inlet and a secondary water outlet;

(g) a supplemental feed conduit connected to said primary water feed conduit and to said secondary water outlet;

(h) a supplemental return conduit connected to said primary return conduit and to said secondary water inlet;

(i) a primary pump which can be controlled by a thermostat to be on or off and operatively connected to said primary return conduit for pumping water from said heat exchange system to said water jacket and back to said heat exchange system when said primary pump is on; and j) a secondary pump which can be controlled by a thermostat to be on or off and operatively connected to one of said supplemental feed conduit and said supplemental return conduit for pumping water from said primary water inlet through said gas-to-water heat exchange apparatus and into said water jacket through said primary water inlet when said primary pump is off and for pumping water from said primary return conduit through said gas-to- water heat exchange apparatus to said primary feed conduit when said primary pump is on and said secondary pump is on.

2. A heating system as recited in claim 1, wherein said gas-to-water heat exchange apparatus is connected in line with said flue, said gas-to-water heat exchange apparatus comprising:

(a) a housing having a chamber, an inlet opening to said chamber connected to a portion of said flue which is operatively connected to said furnace and an outlet opening to said chamber connected to a portion of said flue which is connected to said chimney;

(b) a plurality of spaced plates extending from said inlet opening to said outlet opening;

(b) an inlet manifold pipe containing said secondary water inlet and a plurality of outlet ports;

(c) an outlet manifold pipe containing said secondary water outlet and a plurality of inlet ports; and (d) a plurality of connector pipes, each of said connector pipes extending from one of said outlet ports transversely through said plates to one of said inlet ports.

3. A heating system as recited in claim 1, wherein said secondary pump is operatively connected to said supplemental feed conduit and said supplemental feed conduit is connected to said primary return conduit between said primary pump and said primary water inlet.

4. A heating system as recited in claim 1, wherein said gas-to-water heat exchange apparatus is a secondary gas-to-water heat exchange apparatus and said heating system further comprises a primary gas-to-water heat exchange apparatus above said interior space and operatively connected to said water jacket.

5. A heating system as recited in claim 1, wherein said supplemental return conduit is connected to said primary return conduit at a point between said primary pump and said water jacket and, wherein said supplemental feed conduit is located above said water jacket.

6. A method of increasing the efficiency of a heating system of a building having a gas venting system, said heating system comprising a furnace having an interior space and means to present a flame into said space, said heating system further comprising a heat exchange system for said building, a gas exhaust flue connected to said furnace and to said gas venting system, a water jacket surrounding said inner space and having a primary water inlet at the lower end of the water jacket, and a primary water outlet at the upper end of the jacket, said heating system further comprising a primary feed conduit connecting said heat exchange system to said primary water outlet, a primary return conduit connecting said heat exchange system to said primary water inlet, and a primary pump which can be controlled by a thermostat to be on or off and operatively connected to said primary return conduit for pumping water from said heat exchange system to said water jacket and back to said heat exchange system when said primary pump is on, said method comprising:

(a) connecting a gas-to-water heat exchange apparatus to said gas exhaust flue, said gas-to-water heat exchange apparatus having a secondary water inlet and a secondary water outlet;

(b) connecting a supplemental feed conduit to said primary water feed conduit and to said secondary water outlet;

(c) connecting a supplemental return conduit to said primary return conduit and to said secondary water inlet; and (d) connecting a secondary pump which can be controlled by a thermostat to be on or off and to one of said supplemental feed conduit and said supplemental return conduit for pumping water from said primary water inlet through said gas-to-water heat exchange apparatus and into said water jacket through said primary water inlet when said primary pump is off and for pumping water from said primary return conduit through said secondary gas-to-water heat exchange apparatus to said primary feed conduit when said primary pump is on and said secondary pump is on.

7. A method as recited in claim 6, wherein said secondary pump is connected to said supplemental return conduit and said supplemental feed conduit is connected to said primary return conduit between said primary pump and said primary water inlet.

8. A method as recited in claim 7, wherein said supplemental feed conduit is connected to said primary feed conduit and to said secondary water outlet so that said supplemental feed conduit is located above said water jacket.

9. A method as recited in claim 6, wherein said gas-to-water heat exchange apparatus is connected in line with said gas exhaust flue, said gas-to-water head exchange apparatus having a chamber, an inlet opening to said chamber and an outlet opening to said chamber, said gas-to-water heat exchange apparatus is connected to said flue by:

(a) creating a gap in said flue so that there is an inner flue section connected to said furnace and an outer flue section connected to said gas venting system;

(b) inserting said gas-to-water heat exchange apparatus in said gap;

(c) connecting said inner flue section to said inlet opening; and (d) connecting said outer flue section to said outlet opening.

10. A method of increasing the efficiency of a heating system of a building having a chimney, said heating system comprising a furnace having an interior space and means to present a flame into said space, said heating system further comprising a heat exchange system for said building, a gas exhaust flue connected to said furnace and to said chimney, a water jacket surrounding said inner space and having a primary water inlet at the lower end of the water jacket, and a primary water outlet at the upper end of the jacket, said heating system further comprising a primary feed conduit connecting said heat exchange system to said primary water outlet, a primary return conduit connecting said heat exchange system to said primary water inlet, and a pump which can be controlled by a thermostat to be on or off and operatively connected to said primary return conduit for pumping water from said heat exchange system to said water jacket and back to said heat exchange system when said pump is on, said method comprising:

(a) connecting a gas-to-water heat exchange apparatus to said gas exhaust flue, said gas-to-water heat exchange apparatus having an auxiliary water inlet and an auxiliary water outlet;

(b) connecting a supplemental feed conduit to said primary feed conduit and to said auxiliary water outlet; and (c) connecting a supplemental return conduit to said primary return conduit between said pump and said primary water inlet and to said auxiliary water inlet for pumping water from said primary return conduit through said through said water jacket and through said gas-to- water heat exchange apparatus to said primary feed conduit when said pump is on.

11. A method of increasing the efficiency of a gravity fed heating system of a building having a chimney, said heating system comprising a furnace having an interior space and means to present a flame into said space, said heating system further comprising a heat exchange system for said building, a gas exhaust flue connected to said furnace and to said chimney, a water jacket surrounding said inner space and having a primary water inlet at the lower end of said water jacket, and a primary water outlet at the upper end of said water jacket, said heating system further comprising a primary feed conduit connecting said heat exchange system to said primary water outlet, and a primary return conduit connecting said heat exchange system to said primary water inlet for enabling water to circulate from said heat exchange system to said water jacket and back to said heat exchange system, said method comprising:

(a) connecting a gas-to-water heat exchange apparatus to said gas exhaust flue, said gas-to-water heat exchange apparatus having an secondary water inlet and an secondary water outlet;

(b) connecting a supplemental feed conduit to said primary feed conduit and to said secondary water outlet so that said supplemental feed conduit is located above said water jacket; and (c) connecting a supplemental return conduit to said primary return conduit and to said secondary water inlet for enabling water to circulate from said primary return conduit through said gas-to- water heat exchange apparatus to said primary feed conduit.

12. A gas-to-water heat exchange for use with a heating system for a building having a chimney, said heating system having a furnace, a heat exchange system for said building and a gas exhaust flue connected to said furnace and to said chimney, said gas-to-water heat exchange apparatus comprising:

(a) a housing having a chamber, an inlet opening to said chamber for being connected to a portion of said flue that is connected to said boiler and an outlet opening to said chamber for being connected to a portion of said flue that is connected to said chimney;

(b) a plurality of spaced plates extending from said inlet opening to said outlet opening;

(b) an inlet manifold pipe containing a water inlet and a plurality of outlet ports;

(c) an outlet manifold pipe containing a water outlet and a plurality of inlet ports; and (d) a plurality of connector pipes, each of said connector pipes extending from one of said outlet ports transversely through said plates to one of said inlet ports.

13. A heating system for a building which includes a gas venting system and a heat exchange system for said building, said heating system comprising:

(a) a furnace having an interior space and means to present a flame into said interior space;

(b) a water jacket surrounding said interior space and having a primary water inlet at the lower end of the water jacket, and a primary water outlet at the upper end of the water jacket;

(c) A gas exhaust flue operatively connected to said interior space and for being connected to said gas venting system;

(d) a primary feed conduit connecting said heat exchange system to said primary water outlet;

(e) a primary return conduit connecting said heat exchange system to said primary water inlet;

(f) a gas-to-water heat exchange apparatus operatively connected to said gas exhaust flue and having a secondary water inlet and a secondary water outlet;

(g) pump which can be controlled by a thermostat to be on or off and operatively connected to said primary return conduit for pumping water from said heat exchange system to said water jacket and back to said beat exchange system when said pump is on;

(h) a supplemental feed conduit connected to said primary water feed conduit and connected to said secondary water outlet; and (i) a supplemental return conduit connected to said primary return conduit between said pump and said primary water inlet, said supplemental return conduit for being connected to said secondary water inlet so that water is pumped from said primary return conduit through said gas-to-water heat exchange apparatus to said primary feed conduit when said pump is on.

14. An auxiliary heat recovery system as recited in claim 13, wherein said supplemental feed conduit is located above said water jacket.

15. A gravity fed heating system for a building which includes a gas venting system and a heat exchange system for said building, said heating system comprising:

(a) a furnace having an interior space and means to present a flame into said interior space;

(b) a water jacket surrounding said interior space and having an upper end and a lower end, said water jacket having a primary water inlet at the lower end of the water jacket, and a primary water outlet at the upper end of the water jacket;

(c) A gas exhaust flue operatively connected to said interior space and for being connected to said gas venting system;

(d) a primary feed conduit connecting said beat exchange system to said primary water outlet;

(e) a primary return conduit connecting said beat exchange system to said primary water inlet;

(f) a gas-to-water heat exchange apparatus operatively connected to said gas exhaust flue, said gas-to-water heat exchange apparatus having a secondary water inlet and a secondary water outlet;

(g) a supplemental feed conduit connected to said primary water feed conduit and connected to said secondary water outlet; and (h) a supplemental return conduit connected to said primary return conduit between said pump and said primary water inlet and for being connected to said secondary water inlet so that water is pumped from said primary return conduit through said gas-to-water heat exchange apparatus to said primary feed conduit when said pump is on.

* * * * *